340-566
SR
XR 3,149,320
K 2132E | X 2042
(2)
Sept. 15, 1964 P. J. DEVINE 3,149,320
SIGNALLING APPARATUS
Filed Aug. 13, 1962
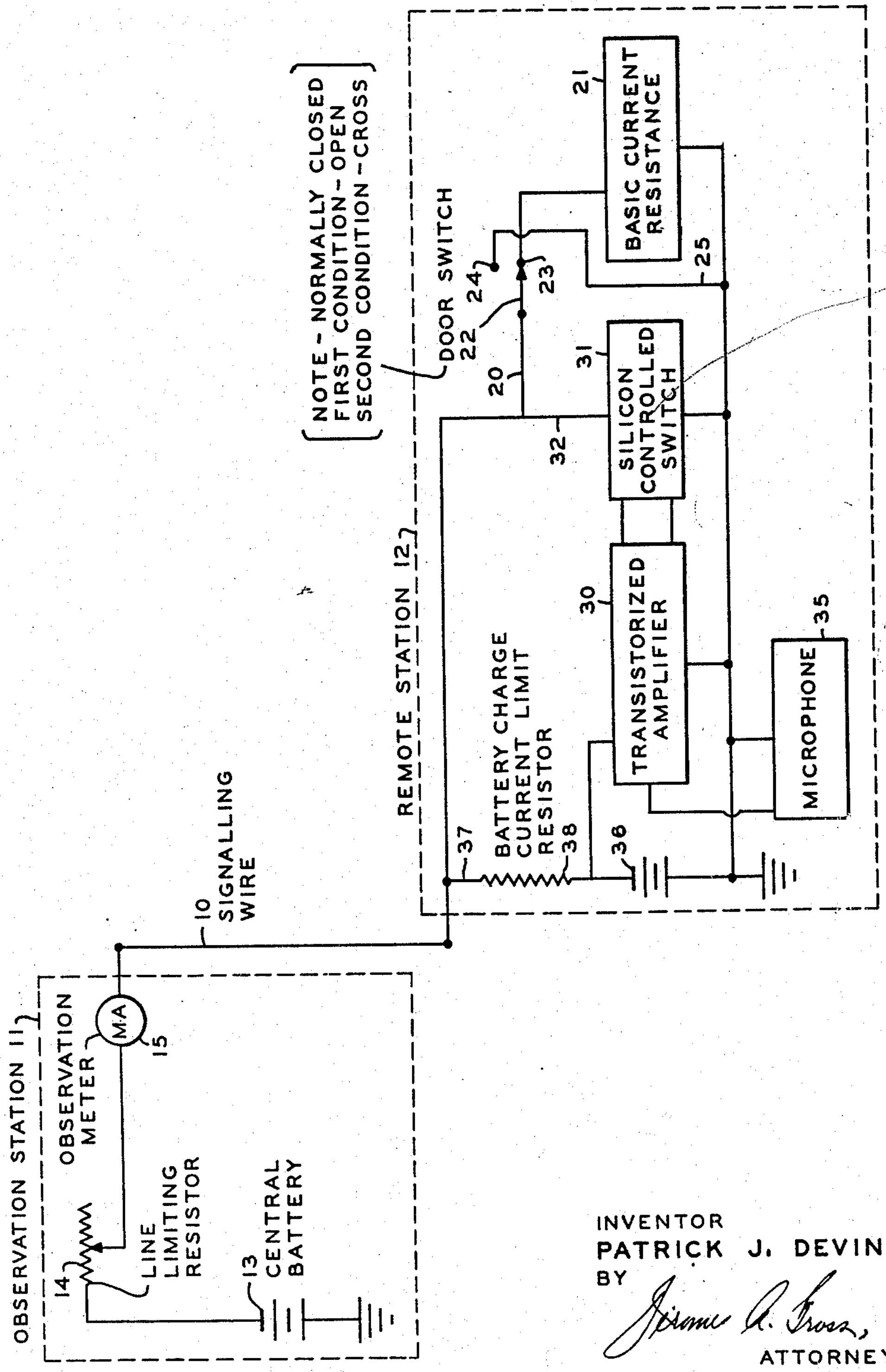
INVENTOR
PATRICK J. DEVINE
BY Jerome A. Fross,
ATTORNEY

United States Patent Office 3,149,320
Patented Sept. 15, 1964

3,149,320
SIGNALLING APPARATUS

Patrick J. Devine, St. Louis, Mo., assignor to Potter Electric Signal Company, St. Louis, Mo., a corporation of Missouri Filed Aug. 13, 1962, Ser. No. 216,489
8 Claims. (Cl. 340—261)

This invention relates to remote station alarm apparatus used in connection with central station systems of the type in which the central station observes or monitors the flow rate of direct currents transmitted through separate signalling wires to the remote stations at which abnormal conditions are to be sensed.

It is quite simple and familiar to use devices which affect flow by mechanical switching or opening the circuit or shorting it. However if abnormal conditions are to be sensed by more delicate means as by a sensor including an electrical amplifier, complexities ensue. If such amplified apparatus is powered from the electrical current supply at the remote station, or by a battery which is recharged from such current supply at the remote station, its reliability is seriously lessened.

A specific purpose of the present invention is to provide a remote sound alarm apparatus such as may be used in vaults, having an amplifier triggered by so-called "attack sounds" to change the flow rate of the current transmitted over a signalling wire from the central observation station, with a battery recharge system independent of any failure of power at the vault. A more general purpose is to provide for the recharging of batteries at remote stations, so that electric power may be used to effect changes in the flow of signalling currents with the same reliability as with mechanical switching. Additional purposes will be apparent from the specification which follows.

The present invention may be described as providing remote station alarm apparatus with circuitry by which the current flow over the signalling wire, sensed at the central station and identifiable as indicating a normally persisting condition, includes charging current for the remote station battery. In the preferred embodiment, a semi-conductor element such as a silicon-controlled switch is operatively connected to the output of a transistorized amplifier for a microphone or other sensor of abnormal conditions, whereby such flow rate over the signalling wire is altered. When the conductivity of the silicon-controlled switch is increased by subjecting it to the output of the amplifier, more current flows over the signalling wire; this increase is observed at the observation station as an alarm signal.

In a larger sense, the invention may be thought of as consisting of the entire signalling system by which direct current, transmitted to a remote station over a signalling wire from a principal current source, includes the charging current for a remote station battery which powers the amplifier for a sensor of abnormal conditions.

In the accompanying drawing, the figure is a block and circuit diagram showing the elements of a signalling system including the remote station sound alarm apparatus which is the specific embodiment of the described.

In a direct current signalling apparatus of the type described, a single signalling wire 10, such as a leased telephone wire, interconnects a central or observation station generally designated 11 with a remote station generally designated 12. A central battery 13 or other source of direct current which may be located at the observation station 11 or at some other convenient point in the circuit, has one lead connected to ground and the other to a line-limiting resistor 14 for each of the interconnecting wires 10 and the remote stations 12.

At the observation station 11, an observation meter 15 is maintained, from which the flow rate over the signalling wire 10 may be observed visually as well as monitored automatically by known devices and circuits which sound and lock in special indications of alarm. The term "observation meter" is intended to include all devices by which changes in current flow may be noted.

In the system of the figure, the basic flow rate identifiable with normal conditions will be a function of the known resistance of elements at the remote station 12, which are placed in circuit by the closing of the door switch 22 on the vault door. Assuming that such resistance establishes as normal some intermediate rate of current flow, any event which would open or break the circuit results in a drop of the flow rate to zero; and any short would increase the flow rate to a limit set by the line limiting resistor 14 and other resistances remaining in the circuitry. In addition parallel leads are selectively put in circuit, singly or together, each lead including a different resistance to the flow rate. Hence a useful number of observably different flow rates may be noted at the observation station 11, and each rate may be generally identified with the specific type of disturbance.

The change from one such parallel lead to another may be made by manual or mechanical switching means; or electrical triggering switch means may be operated from the output of a powered amplifier.

The apparatus of the remote station 12, illustrated in the figure, includes several parallel circuit-making leads to ground. The first of such parallel circuit-making leads 20 includes a basic current resistor 21 which may be set at a chosen resistance, and constitutes the major factor by which a known or basic flow rate is established over the signalling wire 10. Such basic flow rate is identified with the principal normally-persisting condition at the remote station; for example, undisturbed night conditions at a vault, with the door closed and no "attack" sounds present. A vault door switch 22 makes a circuit to the basic current resistor 21 through its first pole 23. As the door begins to open, the circuit is at once opened, breaking off the current flow through the lead 20. A second pole 24 of the switch 22 is engaged, thus creating an increase in current flow over the basic flow rate. If desired, this lead 25 may include a resistance differentiable from that of the basic current resistor 21. Flow through such open-door circuit may be taken as normal during specified business hours, and abnormal during other hours. Such a switch 22 may be manually operated by other mechanical means, or by personnel at the remote station.

More delicate types of abnormal conditions at the remote station 12 may be sensed by suitable sensors having electrical amplifiers, whose output triggers a change in circuit resistance. If the amplifier current output is sufficient, it may operate a relay to switch resistance into or out of circuit, thus observably altering the flow rate of current over the signalling wire.

The apparatus illustrated includes a transistorized amplifier 30 having a relatively small electrical output, sufficient however that, when imposed on a semi-conductor device such as a silicon-controlled switch 31 in a second parallel lead 32, it will change its conductivity markedly. In the circuit illustrated, such increase in the conductivity of the silicon-controlled switch 31 permits a substantial flow of current through the second parallel lead 32. There results a marked increase in current flow which is observed at the observation meter 15.

A sensing device is provided appropriate to sense the condition guarded against. In case of a sound alarm illustrated, this is a simple microphone 35. It picks up abnormal "attack sounds" and transmits them to the amplifier 30 whose electrical output operates the silicon-controlled switch 31. For detection of abnormal conditions other than sounds, other appropriate sensors would be substituted for the microphone. All such sensors, the transistorized amplifier 30, the silicon-controlled switch 31 and the other circuit elements, are conventional.

Because of the low power requirements of the transistorized amplifier 30 and silicon-controlled switch 31, a relatively low power remote station battery 36 is sufficient to trigger the charge in current flow rate, and a small flow of current will suffice to keep it fully charged. In the present invention, a third parallel lead 37 from the signalling wire 10 to ground supplies the battery 36 with its recharging current, through a current-limiting resistor 38. Such battery 36 is preferably of the nickel-cadmium type or of the silver-cadmium type, which accept a recharging current at a substantially constant rate. The term "substantially constant" is here used in a practical sense; it requires merely that the current flow shall not vary so greatly with the state of charge of the battery as to interfere with differentiation at the observation station between normal and abnormal conditions. The recharge current limiting resistor 38 is preferably a simple resistance fixed at a value which will so divide the current as to effect ample recharging during the expected persistence of normal conditions.

By the circuitry provided, recharging current for the remote station battery 36 is included in the basic flow rate of signalling current over the wire 10. This innovation serves to add greatly to the reliability of the apparatus and the scope of potential utilizations. The embodiment disclosed may be equipped with added test circuitry which is conventional, and miscellaneous added features extraneous to the present invention. Further, modifications in detail will present themselves to the minds of persons familiar with the art and its problems. Accordingly, the present invention is not to be construed narrowly, but instead as fully co-extensive with the claims hereof.

I claim:

1. For use with a central signal station at which is observed the flow of direct current transmitted from a direct current source at said central station through a signalling wire to
   an improved remote station sound alarm having an input terminal for connection to the signalling wire,
   a basic current resistor in a first parallel circuit connected to said input terminal, by whose resistance a known basic flow rate over the signalling wire is identifiable with a normally persisting condition at the remote station,
   silicon-controlled switch means in a second parallel circuit connected to said input terminal to alter the basic flow rate,
   a microphone,
   a transistorized amplifier connected to said microphone, the output of the amplifier being operatively connected to the silicon-controlled switch means,
   a rechargeable remote station battery connected to said transistorized amplifier for supplying power thereto, and
   a battery recharge current limiting resistor in a third parallel circuit including said remote station battery,
   whereby such basic flow rate over the signalling wire includes the flow rate of charging current for the remote station battery.

2. An improved remote station sound alarm as defined in claim 1,
   together with electro-mechanical switching means connected to said input terminal to shunt said basic flow rate from said basic current resistor thereby altering the basic flow rate differently than its alteration by the silicon-controlled switch means.

3. For use with a central signal station at which is observed the flow of direct current transmitted from a direct current source at said central station through a signalling wire to an improved remote station alarm comprising an input terminal for connection to the signalling wire,
   a basic current resistor in a first parallel circuit connected to said input terminal, by whose resistance a known basic flow rate over the signalling wire is identifiable with a normally persisting condition at the remote station,
   a second parallel circuit connected to said input terminal having switch means operated by electrical current for altering the basic flow rate in said first parallel circuit,
   sensor means responsive to an abnormal condition at the remote station,
   said sensor means having an amplifier including an electrical output operatively connected to the said electrically operated switch means,
   a rechargeable remote station battery connected to said amplifier for supplying current thereto, and
   a third parallel circuit connected to said input terminal including said remote station battery and means providing a limited current to the rechargeable battery,
   whereby such basic flow rate over the signalling wire includes the flow rate of charging current for the rechargeable battery.

4. A improved remote station alarm as defined in claim 3, characterized in that
   the means providing a limited current to the chargeable battery include a fixed resistor, and
   the battery is of a type which accepts a recharging current at a substantially constant rate.

5. For use with a central signal station at which is observed the flow of direct current transmitted from a direct current source at said central station through a signalling wire to,
   an improved remote station alarm comprising an input terminal for connection to the signalling wire,
   a basic current resistor in a first parallel circuit connected to said input terminal, by whose resistance a known basic flow rate over the signalling wire is identifiable with a normally persisting condition at the remote station,
   a second parallel circuit connected to said input terminal having switch means operated by electrical current, said switch means being semi-conductor means of the type whose conductivity is altered when an electrical current is imposed thereon,
   detector means responsive to an abnormal condition at the remote station,
   said detector means having an amplifier including an output terminal connected to the semi-conductor means,
   a rechargeable remote station battery connected to said amplifier for supplying power to the amplifier, and
   a third parallel circuit connected to said input terminal including said remote station battery and means providing a limited current to the rechargeable battery,
   whereby such basic flow rate over the signalling wire includes the flow rate of charging current for the rechargeable battery.

6. For use with a central signal station having a direct current power source, a signalling wire extending therefrom, and measuring apparatus connected to the signalling wire and the direct current power source for indicating the flow of current in said signalling wire,
   an improved remote station, powered and operated from the central signal station, comprising
   a plurality of parallel electrical circuits connected to and branching from the signalling wire and converging to a common reference potential,
   said electrical circuits comprising
   a first parallel circuit having a series resistor therein for establishing a predetermined current through said signalling wire the magnitude of which is identifiable with a normally persisting condition at the remote station, a second parallel circuit having switching means therein for changing the magnitude of the current through the signalling wire, and a third parallel circuit having a rechargeable remote station battery and attendant series limiting resistor therein, condition sensing means actuated by an abnormal condition at the remote station, and a transistorized amplifier connected to said remote station battery, said switching means, and said sensing means for amplifying the signals received from said sensing means and supplying the amplified output signals to said switching means, whereby current for charging said remote station battery and said first predetermined current are supplied from the central signal station by said signalling wire.

7. An improved remote station sound alarm as defined in claim 6, wherein said switching means is a silicon-controlled switch.

8. An improved remote station sound alarm as defined in claim 7, wherein the condition sensing means is a microphone.

References Cited in the file of this patent

UNITED STATES PATENTS

| | | |
|---|---|---|
| 1,322,177 | Buhl | Nov. 18, 1919 |
| 1,921,024 | Field | Aug. 8, 1933 |
| 2,064,533 | Grant | Dec. 15, 1936 |
| 3,060,416 | Brown | Oct. 23, 1962 |